United States Patent [19]

Rampe

[11] E Re. 29,220

[45] Reissued May 17, 1977

[54] VIBRATORY FINISHING MACHINE

[75] Inventor: John F. Rampe, Mayfield Heights, Ohio

[73] Assignee: Rampe Research, Cleveland, Ohio

[22] Filed: Dec. 18, 1972

[21] Appl. No.: 315,787

Related U.S. Patent Documents

Reissue of:

[64] Patent No.: 3,449,869
Issued: June 17, 1969
Appl. No.: 534,710
Filed: Mar. 16, 1966

U.S. Applications:

[63] Continuation of Ser. No. 42,908, Dec. 11, 1970, abandoned.

[52] U.S. Cl. ..... 51/163.1
[51] Int. Cl.[2] ..... B24B 31/06
[58] Field of Search ..... 51/7, 163; 241/175; 259/72

[56] References Cited

UNITED STATES PATENTS

| | | | |
|---|---|---|---|
| 2,088,313 | 7/1937 | Wettlaufer | 51/163 UX |
| 2,515,693 | 7/1950 | Buhrer | 51/7 UX |
| 2,997,813 | 8/1961 | Brandt | 51/163 X |
| 3,021,082 | 2/1962 | Sullivan | 241/175 |
| 3,045,397 | 7/1962 | Hasslenberg | 51/7 |
| 3,082,965 | 3/1963 | Decker et al. | 241/175 X |
| 3,210,891 | 10/1965 | Joy | 51/163 |
| 3,295,768 | 1/1967 | Moore | 241/175 X |

FOREIGN PATENTS OR APPLICATIONS

| | | | |
|---|---|---|---|
| 899,573 | 12/1953 | Germany | 51/163 |
| 702,307 | 2/1941 | Germany | 241/175 |
| 125,117 | 8/1959 | U.S.S.R. | 241/175 |

OTHER PUBLICATIONS

Vibrating Mill, Allis-Chalmers, 4 pages, Dec. 1961.

*Primary Examiner*—Harold D. Whitehead
*Attorney, Agent, or Firm*—David A. Burge Co.

[57] ABSTRACT

A precision finishing machine characterized by orbital movement of bulk finishing media comprising supporting structure; a centrally disposed receptacle resiliently mounted on the supporting structure; a plurality of shaft-supported eccentrics mounted on opposing sides of said centrally disposed receptacle at substantially the level of the center of mass of the receptacle and its load, the longitudinal axes of said shaft-supported eccentrics paralleling one of the horizontal axes of the receptacle; flexible couplings connected to the eccentrics; and, connected to the couplings, a drive system including power means and auxiliary means for positioning, adjusting the position of, and controlling the power means.

14 Claims, 5 Drawing Figures

INVENTOR.
JOHN F. RAMPE
BY Beckett, Gibbons, Martin & Finnegan
ATTORNEYS.

INVENTOR.
JOHN F. RAMPE
BY
ATTORNEYS.

VIBRATORY FINISHING MACHINE

Matter enclosed in heavy brackets [ ] appears in the original patent but forms no part of this reissue specification; matter printed in italics indicates the additions made by reissue.

*This application is a continuation of Ser. No. 42,908, filed Dec. 11, 1970, and now abandoned, which is a reissue application of U.S. Pat. No. 3,449,869.*

This invention, which deals with a precision finishing machine of an orbital type that is characterized by circular movement of the finishing medium, constitutes an improvement on vibratory finishing machines such as those disclosed, inter alia, in prior patent Nos. 3,191,347, 3,191,348, 3,230,671, 3,300,908, 3,337,997 and 3,339,316, all in the name of John F. Rampe.

In general, the various types of commercial orbital finishing machines heretofore employed in the precision finishing of work pieces of metal, plastic or the like have been used for the most part only (mainly because they are relatively expensive) in those instances in which the goods do not lend themselves to finishing by the more conventional methods of grinding, buffing and polishing. The provision of a much simpler and considerably less expensive precision finishing machine that will accomplish to better advantage the purposes and objectives for which orbital finishing machines are commonly used is the major object of the present invention.

To that end, the invention provides a precision finishing machine of the orbital type that is at once simple, sturdy and, by comparison with the commercial orbital finishing machines of the prior art, much less expensive to assemble, service and repair. At the same time, the orbital finishing machine of the present invention is one that lends itself not only to use in the precision finishing of goods that cannot easily be finished by the commonly employed methods of grinding, buffing and polishing but also to economical use in the precision finishing of a wide variety of goods of types that are normally finished by just such methods. Thus the invention provides a vibratory finishing machine characterized by unusual versatility that is likely to appeal to a broader market than the more complex finishing machines heretofore available.

Further, the invention provides a precision finishing machine of the orbital type in which the center of mass and the geometrical center of the orbit of the finishing medium coincide under normal conditions of operation; viz., with the machine loaded to capacity. This result is brought about by designing, constructing and locating the vibration inducing components on opposite sides of the receptacle at, or very close to, the level of the center of mass of the receptacle and its contents. A correlative result is the development of an induced orbital movement of the finishing medium that is intrinsically circular; i.e., neither elliptical nor linear after the fashion of the resultant of a plurality of external forces acting on the machine more or less independently of each other (as, for example, horizontally and vertically) at one and the same time.

A further object of the invention is the provision of a precision finishing machine of the vibratory type in which the prime mover or movers and the power train associated therewith may be moved out of original positions at a given level into new positions at higher or lower levels. For example, if, as frequently happens, sag of the receptacle and associated components develops to an extent that cannot be compensated by the use of self-aligning couplings, this feature makes it possible to move the power system to a level to which the couplings can effectively accommodate themselves. Thus it becomes possible to operate unhampered by the limitations imposed by conventional flexible couplings of kinds that provide a relatively narrow range of permissible deviation from true linearity.

Other objects, advantages and features of the invention will appear from the description and drawings, in which.

Figure 1:
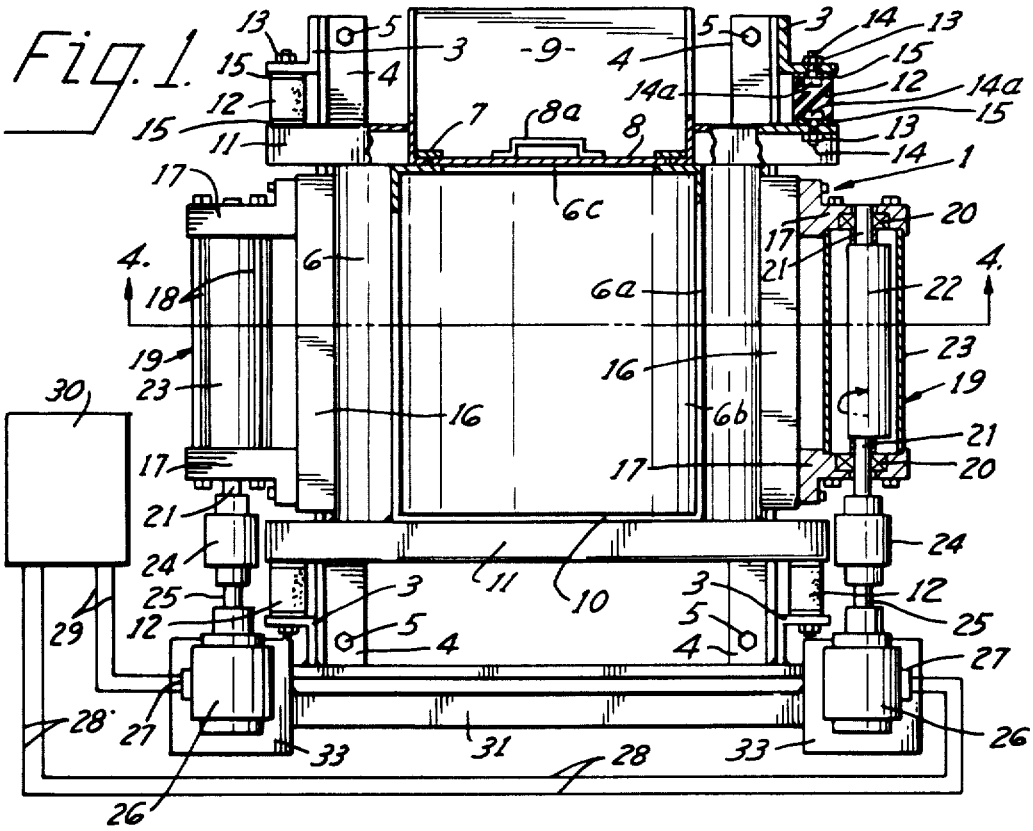
FIG. 1 is a top plan of a precision finishing machine of the orbital type incorporating the features of the present invention.
Figure 2:
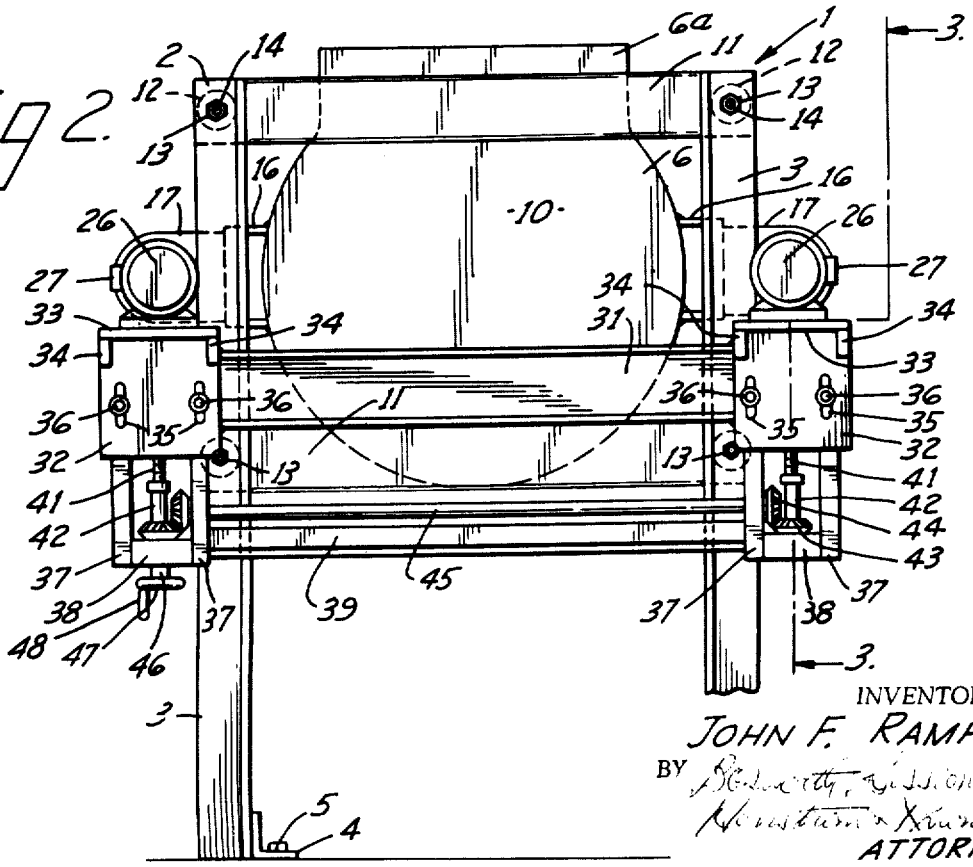
FIG. 2 is a front end elevation of the machine.
Figure 3:
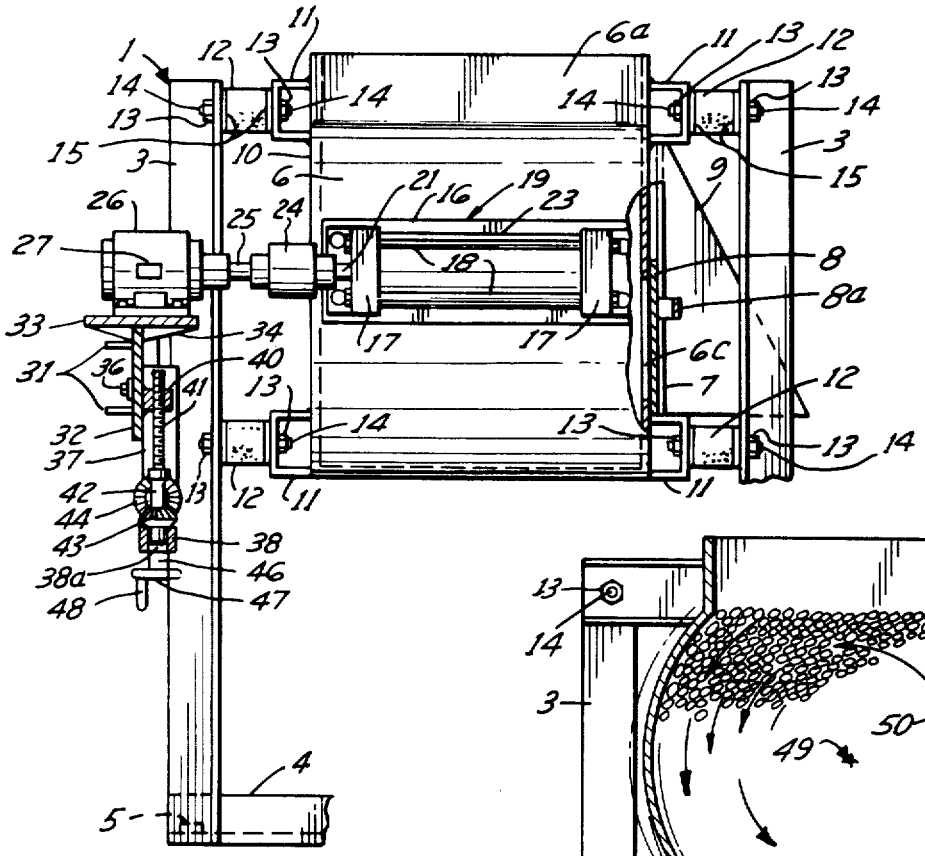
FIG. 3 is a side elevation of the machine with parts in section: see line 3—3 of FIG. 2.

In FIGS. 1, 2 and 3 is shown a precision finishing machine 1 constructed in conformity with the principles of the present invention. Supporting structure 2, best seen in FIGS. 2 and 3, consists of four vertical uprights 3 and, at floor level, two horizontal cross members 4 that are fastened to the floor by means of bolts 5. Uprights 3, of which there is one at each corner of the machine, and the two cross members preferably take the form of structural angles (see FIGS. 1 and 2).

Within supporting structure 2 is a generally cylindrical receptacle 6, usually referred to as the tub, of a type characterized, among other things, by a vertical top flange 6a surrounding a symmetrically located oblong top opening 6b. In addition to top opening 6b there is an end opening 6c, shown or indicated in FIGS. 1, 3 and 4. Flanking the vertical sides of end opening 6c is a plurality of rigidly supported guides 7 for a vertically slidable door 8 that is provided with a lifting handle 8a. Disposed outwardly of end opening 6c is a chute 9, seen in FIGS. 1 and 3. All of the parts referred to immediately above are at that one of the two flat ends of the tub which is seen at the right in FIG. 3; the unbroken opposite end of the tub, designated 10, is not only planar but substantially unobstructed except as hereinbelow indicated.

Welded to the flat ends of tub 6 are four horizontally extending U-shaped channels 11, best seen in FIGS. 1 and 2, of which two are ordinarily located at the same horizontal level at or very near the top of supporting structure 2 and two are located about half-way between the top and bottom of such supporting structure. Like the channels of the upper pair, those of the lower pair are at the same horizontal level. Channels 11 do not form part of but are spaced inwardly of the supporting structure, as will be apparent from FIG. 1.

In addition to being welded to tub 6, channels 11 are connected to uprights 3 through elastomeric spacers 12 made of neoprene, rubber or the like that are held in position by means of metal nuts 13, studs 14, and washers 15 to which the elastomer is bonded, as by vulcanization. Heads 14a on the inner ends of studs 14 are likewise bonded to the elastomer, by which they are surrounded except where they engage washers 15.

The opposite ends of spacers 12 are similarly constructed for attachment to uprights 3.

Within the rather narrow limits imposed by spacers 12, tub 6 is therefore free to move up, down and sideways within supporting structure 2. When the machine is idle and tub 6 is empty or virtually empty, which is the condition illustrated in FIGS. 1 to 4, the sag or downward displacement attributable to the weight of tub and associated components is small enough to be negligible for practical purposes; however, when tub 6 is filled to capacity, the downward displacement is as much as three-fourths of an inch, which is hardly a negligible factor.

Figure 4:
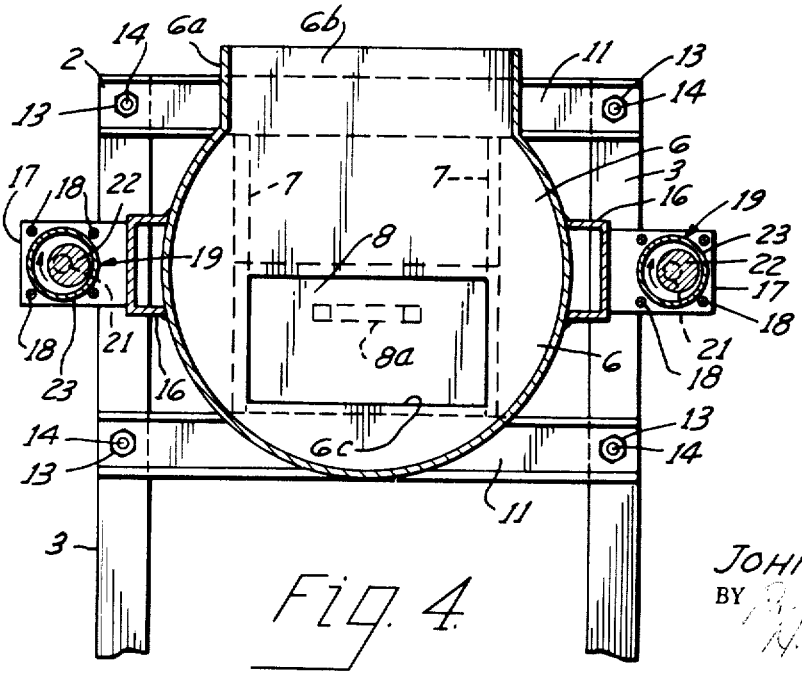
FIG. 4 is a central vertical section on line 4—4 of FIG. 1.

Welded to and extending horizontally lengthwise of the widest portions of the two cylindrical sides of tub 6 are the relatively heavy structural channels 16 seen in FIGS. 1, 2 and 4. Mounted on channels 16 and projecting laterally from them in oppositely directed pairs are heavy-duty bearing mounts 17, two on the left-hand side and two on the right side of the machine as seen in FIGS. 1 and 2. Tie rods 18, seen in FIGS. 1 and 4, connect the oppositely facing bearing mounts of each pair. Inwardly of tie rods 18 are cartridges 19 each of which may be thought of as embracing two roller bearings 20, a centrally located shaft 21, a cylindrical eccentric 22 supported by shaft 21, and an exterior housing 23 of cylindrical shape.

Shafts 21 and cylindrical eccentrics 22 rotate within housings 23 in the manner indicated in FIG. 4. The eccentrics are so related to each other that they are in the same relative position at the same time; e.g., the three-o'clock position shown for illustrative purposes in FIG. 4. In consequence, the action of each of the two eccentrics is to reinforce that of the other rather than to oppose it, as would be the case if they were offset by 180° from each other. A circular movement of limited dimensions is imparted to tub 6 by eccentric 22; at the same time, as will appear below, a circular orbital path is imparted to any finishing media within the tub.

Coupled to eccentric shafts 21 by means of flexible or self-aligning couplings 24 are the two shafts 25 of two direct current motors 26 that should be operated in precise synchronism with each other. Leads 28 and 29 connect motors 26 through terminals 27 to a common control unit 30, preferably a control unit of the selenium rectifier type. In describing motors 26 as of the direct current type and in referring to control unit 30 as incorporating a selenium rectifier, one must not overlook the fact that other kinds of motors and control systems may be used in lieu of those shown for illustrative purposes in FIGS. 1 to 3.

Paralleling structural channels 11 is a third structural channel 31 located outside supporting structure 2. It extends horizontally from a first zone a little to one side and somewhat below one of the two motors 26 to a second zone a little to the side and somewhat below the other of the two motors. As indicated in FIGS. 1 and 2, channel 31 is welded at its ends to two upright support plates 32 on each of which is mounted a horizontally extending platform 33 that is preferably braced from beneath as by gussets 34. Each of platforms 33 supports one of the two motors 26.

Support plates 32 are provided with paired vertical slots 35, one pair in each of the two support plates. Threaded studs 36 that project horizontally from vertically extending guides 37, connected by cross pieces 38 (FIG. 2), extend outwardly into and thence outwardly of slots 35. There are two such studs for each support plate, each equipped with a locking nut for holding the support plate in desired relation to guides 37. Within limits, therefore, support plates 32 may be moved up or down in relation to studs 36.

Tie bars 39 two of which, upper and lower, are usually employed in the installation (only one appears in the drawings) are used to connect the inner of the two guides on the left-hand side of the machine with the inner of the two guides on the right-hand side of the machine, seen as in FIG. 2.

As has already been indicated, the invention contemplates the use of a plurality of vibration inducing components at the level of or, differently stated, in the horizontal plane including the center of mass of the tub and its contents. If tub 6 is filled to capacity, the normal condition, such plane will not only include the center of mass but will pass through the longitudinal axis of the tub. Whether or not the latter is the case, so long as the plane includes the center of mass, the orbital movement produced in the finishing medium will be circular or very nearly circular. This is desirable, because under such conditions the goods to be finished are kept from working their way to the bottom of the tub where, by striking each other, they might develop defects that would be difficult or impossible to remove.

Figure 5:
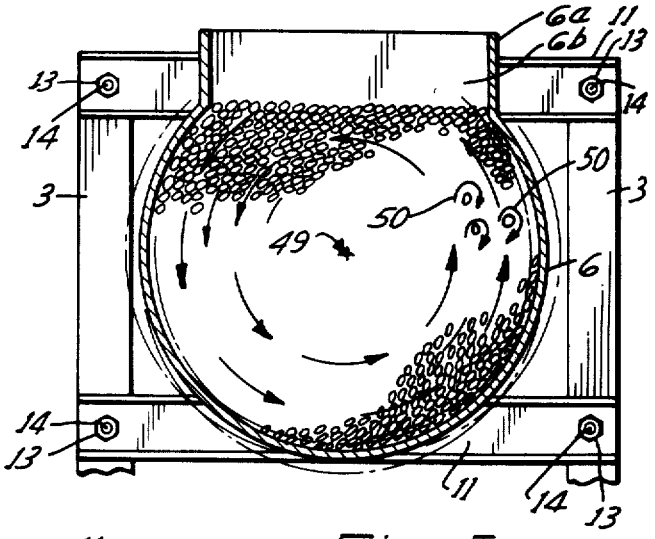
FIG. 5 is a fragmentary view similar to that of FIG. 4 illustrating in diagrammatic fashion the nature of the movement imparted to the finishing media.

If, in such circumstances, the direction of rotation of eccentric shafts 21 is clockwise, as indicated by the arrows in FIGS. 1 and 4, the direction of movement of the finishing medium is counter-clockwise, as indicated in FIG. 5; if the direction of rotation is counter-clockwise, the movement of the finishing medium is clockwise.

As previously noted, tub 6 tends to sag appreciably when filled to capacity, which is the normal condition; nevertheless, that it will at all times be filled to capacity does not follow, for it is quite possible to operate (although at the expense of efficiency) with the tub filled to a considerably lower level. However, in the former case, if the sag is great enough, it can exceed the ability of flexible couplings 24 to compensate for it. This makes it highly desirable, in order to avoid operating at less than capacity, to introduce adjusting means of the kind illustrated in the drawings and explained below.

Welded to the back face of each of the two support plates 32 is a nut 40 that is tapered to enable it to cooperate with the threaded upper end of a vertically extending adjusting screw 41. There is one of these on each side of the machine, viewed as in FIG. 2. Each is coupled at its lower end to a vertical shaft 42 the opposite end of which extends downwardly into an opening 38a in cross piece 38 (see FIG. 3). Each of the two vertical shafts 42 mounts a horizontally disposed bevel gear 43 that mates with a vertically disposed bevel gear 44 carried by a horizontally extending connecting shaft 45 (see FIG. 2).

On the left-hand side of the machine, seen as in FIG. 2, the downwardly projecting portion of vertical shaft 42 is coupled to the hub 46 of a hand wheel 47 operated by means of a handle 48. By rotating hand wheel 47, the vertical shaft on which it is mounted can be made to rotate the attached horizontally disposed bevel gear 43. The latter in turn rotates the cooperating vertically disposed bevel gear 44 and shaft 45. In consequence thereof, bevel gears 43 and 44 on the opposite side of the machine, the right-hand side in FIG. 2, operate to turn vertical shaft 42 and screw 41. As screws 41 turn within nuts 40, they cause corresponding upward or downward movement of support plates 32, platforms 33 and motors 26.

This arrangement makes it possible to bring the horizontal plane containing the axes of rotation of motor shafts 25 to a level in which such plane will coincide with the horizontal plane passing through the axes of rotation of eccentric shafts 21. In such case, they will also pass through or close to the horizontal line including the center of mass; for example, the horizontal line represented by point 49 in FIG. 5. When this condition obtains the desirable circular orbit illustrated by arrows in FIG. 5 will be representative of the action within the tub.

Note particularly the clockwise direction of rotation of the individual particles indicated at 50. It will be observed that the latter are carried up or tend to work their way up inside the tub, although moving individually in generally clockwise fashion. Some will naturally be in contact with the interior wall of the tub, but most will be located well inwardly thereof. In general, the action of the mass as a whole is orbital, circular, and centered around the horizontal line indicated at 49 in FIG. 5. This of course assumes that the vibration inducing systems on opposite sides of the tub are, so far as possible, at substantially the same level as such horizontal line.

Mention has already been made of the fact that in lieu of direct current motors 26 and a control unit 30 of the selenium rectifier type, various other systems for producing synchronous movement of eccentric shafts 21 may be employed. It is possible, for example, to use two synchronous motors, two alternating current motors of conventional type driven from a common variable speed drive, or two conventional motors the shafts of which are inter-connected by a power train of some sort other than the one shown in FIGS. 2 and 3. If desired, a single motor may be mounted beneath tub 6; if so, cog belts may be employed to drive the eccentric shafts from such motor.

In the practice of the invention, which among other things includes the concept of disposing the longitudinal axes of eccentric shafts 21 and motor shafts 25, insofar as it may be possible to do so, in a common horizontal plane passing through the center of mass, it is not necessary to use eccentrics of the type hereinabove shown and described. Other vibration inducing components may be used instead: for example, magnetic and pneumatic vibration inducing components. In any case, an important precaution to be observed if possible is that the forces exerted by the vibration inducing components should be such as to reinforce rather than to oppose each other. Where circumstances permit, they should operate on the tub and its contents at the level of the center of mass so as to develop the above-described circular orbit.

It is intended that the patent shall cover, by summarization in appended claims, all features of patentable novelty residing in the invention.

What is claimed is:

1. A precision finishing machine characterized by orbital movement of bulk finishing media, comprising:

*a. a* supporting structure *including first and second spaced opposed upstanding structures;*

*b.* a centrally disposed receptacle *positioned longitudinally between said structures and having first and second regions positioned near said first and second structures, respectively;*

*c. elastomeric spacer means* resiliently [ mounted ] *mounting said receptacle* on the supporting structure *including a first plurality of elastomeric spacers interposed between said first region and said first structure, and a second plurality of elastomeric spacers interposed between said second region and said second structure;*

*d.* vibration-inducing means *including a plurality of shaft-supported eccentrics mounted* on opposite sides of the receptacle at substantially the level of the center of mass of the receptacle and its load [ , such vibration-inducing means including ], *the longitudinal axes of said shaft supported eccentrics paralleling the longitudinal horizontal axis of the receptacle;*

*e.* power means *drivingly coupled to said vibration-inducing means;* [ and, as an adjunct thereto ] ;

*f.* an auxiliary system for positioning, adjusting the position of, and controlling the power means [ . ] ; *and,*

*g. said elastomeric spacers being arranged with their longitudinal mounting axes disposed generally parallel to the longitudinal horizontal axis of the receptacle and said vibration-inducing means being operative to impart vibrations to said tub in directions substantially transverse to the tub thereby subjecting said elastomeric spacers principally to shear forces as said regions move relative to said structures.*

2. A precision finishing machine according to claim 1 wherein the [ vibration-inducing ] *power* means include electric motors mounted on supports that may be raised and lowered in relation to the supporting structure [ of the machine as a whole ] *and said auxiliary system includes means for selectively raising and lowering said supports.*

3. A precision finishing machine [ according to claim 2 wherein ] *comprising:*

*a. a supporting structure including first and second spaced opposed upstanding structures;*

*b. a centrally disposed receptacle positioned between said structures and having first and second regions positioned near said first and second structures, respectively;*

*c. elastomeric spacer means resiliently mounting said receptacle on the supporting structure including a first plurality of elastomeric spacers interposed between said first region and said first structure, and a second plurality of elastomeric spacers interposed between said second region and said second structure;*

*d. vibration-inducing means on opposite sides of the receptacle at substantially the level of the center of mass of the receptacle and its load;*

*e. power means including electric motors drivingly coupled to said vibration inducing means;*

*f. an auxiliary system including motor supports and means adjustably positioning said motor supports for raising and lowering said motors relative to said supporting structure;*

*g. said vibration-inducing means being operative to impart vibrations to said tub in directions substantially transverse to the tub thereby subjecting said elastomeric spacers principally to shear forces as said regions move relative to said structures; and,*

*h. said auxiliary system additionally includes a common power train interconnecting* the motor supports [ are connected through a common power train ] *for concurrent movement.*

4. A precision finishing machine characterized by orbital movement of bulk finishing media, comprising:

*a.* a supporting structure *including first and second spaced opposed upstanding end structures;*

*b.* a centrally disposed receptacle *positioned longitudinally between said end structures and having first and second end regions positioned near said first and second end structure, respectively;*

*c. elastomeric spacer means* resiliently [ mounted ] *mounting said receptacle* on the supporting structure *including a first plurality of elastomeric spacers interposed between said first end region and said first end structure, and a second plurality of elastomeric spacers interposed between said second end region and said second end structure, said spacers each having their mounting axes disposed generally parallel to the longitudinal axis of the receptacle;*

*d.* a plurality of eccentrics mounted on opposite sides of the receptacle at the level of the center of mass with the axes of rotation of the eccentrics extending parallel to [ one of ] the horizontal [ axes ] *longitudinal axis* of the receptacle; [ and, ]

*e. a drive system* connected to the eccentrics [ a drive system ] including power means and auxiliary means for positioning, adjusting the position of, and controlling the power means [.] *; and,*

*f. said vibration-inducing means being operative to impart vibrations to said tub in directions substantially transverse to the length of the tub thereby subjecting said elastomeric spacers principally to shear forces as said end regions move relative to said end structures.*

5. A precision finishing machine according to claim 4 wherein the drive system includes a plurality of prime movers operated in synchronism with each other.

6. A precision finishing machine according to claim 5 wherein the prime movers are mounted on movable support means that may be raised and lowered in relation to the supporting structure for the machine as a whole.

7. A precision finishing machine according to claim 6 wherein the support means for the prime movers are coupled to a common power train.

8. A precision finishing machine characterized by orbital movement of bulk finishing media, comprising:

*a. a* supporting structure *including first and second spaced opposed upstanding end structures;*

*b.* a centrally disposed receptacle *positioned longitudinally between said end structures and having first and second end regions positioned near said first and second end structures, respectively;*

*c. elastomeric spacer means* resiliently [ mounted on ] *mounting said receptacle on* the supporting structure *including a first plurality of elastomeric spacers interposed between said first end region and said first end structure; and a second plurality of elastomeric spacers interposed between said second end region and said second end structure, said spacers each having their mounting axes disposed generally parallel to the longitudinal axis of the receptacle;*

*d.* a plurality of shaft-supported eccentrics mounted on opposing sides of said centrally disposed receptacle, the longitudinal axes of said shaft-supported eccentrics paralleling [ one of ] the horizontal [ axes ] *longitudinal axis* of the receptacle;

*e.* flexible couplings connected to the eccentrics; [and,]

*f. a drive system* connected to the couplings [, a drive system ] including power means and auxiliary control means for the power means [.] *; and,*

*g. said vibration-inducing means being operative to impart vibrations to said tub in directions substantially transverse to the length of the tub thereby subjecting said elastomeric spacers principally to shear forces as said end regions move relative to said end structures.*

9. A precision finishing machine according to claim 8 wherein the drive system includes a plurality of electric motors operating in synchronism with each other.

10. A precision finishing machine according to claim 9 wherein the motors are of the synchronous type.

11. A precision finishing machine according to claim 9 wherein the electric motors are operated in synchronism with each other through the medium of a common control system.

12. A precision finishing machine according to claim 11 wherein the control means include a rectifier and the motors are direct current motors.

13. A precision finishing machine characterized by orbital movement of bulk finishing media, comprising:

a. a supporting structure;

*b.* a centrally disposed receptacle resiliently mounted on *elastomeric spacers connected to* the supporting structure;

*c.* a plurality of shaft-supported eccentrics mounted on opposing sides of said centrally disposed receptacle at substantially the level of the center of mass of the receptacle and its load, the longitudinal axes of said shaft-supported eccentrics paralleling one of the horizontal axes of the receptacle;

*d. said elastomeric spacers being arranged with their longitudinal mounting axes disposed generally parallel to said eccentrics axes whereby such relative movements as are caused by said eccentrics between said receptacle and said supporting structure will subject said spacers principally to shear forces;*

*e.* flexible couplings connected to the eccentrics; and,

*f. a drive system* connected to the couplings [ a drive system ] including power means and auxiliary control means for the power means.

14. A precision finishing machine characterized by orbital movement of bulk finishing media, comprising:

*a. a* supporting structure;

*b.* a centrally disposed receptacle;

*c. elastomeric spacer means interposed between said receptacle and said supporting structure* resiliently [ mounted ] *mounting said receptacle* on the supporting structure;

*d.* a plurality of shaft-supported eccentrics mounted on opposite sides of said centrally disposed receptacle at substantially the level of the center of mass of the receptacle and its load, the longitudinal axes of said shaft supported eccentrics paralleling [ one of ] the *longitudinal* horizontal [ axes ] axis of the receptacle;

*e. said elastomeric spacer means including a plurality of elastomeric spacers each having first and second opposite end regions positioned along axes paralleling said longitudinal axis, said first end region being connected to said receptacle and said second end region being connected to said supporting structure;*

*f.* flexible couplings connected to the eccentrics; and

*g. a drive system* connected to the couplings [, a drive system ] including power means, vertically adjustable supports therefore, and control means for the power means.

* * * * *